Jan. 24, 1939. J. KREISLER Re. 20,986

VANITY CASE

Original Filed Sept. 14, 1934 3 Sheets-Sheet 1

INVENTOR
JACQUES KREISLER.
BY Edwin Reisler
ATTORNEY

Jan. 24, 1939. J. KREISLER Re. 20,986

VANITY CASE

Original Filed Sept. 14, 1934 3 Sheets-Sheet 2

INVENTOR
JACQUES KREISLER.
BY Edwin Lewis
ATTORNEY

Jan. 24, 1939. J. KREISLER Re. 20,986

VANITY CASE

Original Filed Sept. 14, 1934 3 Sheets-Sheet 3

INVENTOR
JACQUES KREISLER.
BY Edwin Leisola
ATTORNEY

Reissued Jan. 24, 1939

Re. 20,986

UNITED STATES PATENT OFFICE 20,986

VANITY CASE

Jacques Kreisler, New Rochelle, N. Y., assignor to Jacques Kreisler Sales Corporation, a corporation of New York Original No. 1,987,533, dated January 8, 1935, Serial No. 743,941, September 14, 1934. Application for reissue December 23, 1935, Serial No. 55,857

33 Claims. (Cl. 220—35)

This invention relates to improvements in vanity cases and has particular reference to the type of case embodying therein a plurality of compartments each with a cover controlled from the exterior of the case.

It must be appreciated that vanity cases in particular are articles of manufacture which must not only have artistic appeal to the highest degree, but must be extremely practical in use. The exteriors of the cases of this character should lend themselves to applied designs in filigree, enamels and other finishes, both elaborate and delicate. Many examples of this art have been and are being made, but in order to facilitate operations of the moving parts, as for example the covers to the compartments, many complicated contrivances are being used to bring about the desired movements. Springs are often very liberally used in these constructions to aid in lifting covers and even the compartments, if the designs include a set of nested containers for the various vanities. It goes without saying that elaborate mechanisms, no matter how beautifully they are made to work or how efficient they may be in operation, are very easily thrown out of adjustment and require more space in which to operate than can be allotted for the purpose in an article as delicate and small as a vanity case.

In the present invention, the greatest care and ingenuity have been exercised in combining the utmost in artistic design with the most practical in construction, and in doing so I have sought to provide a vanity case which is easy to handle, comfortable to operate and which, because of the use of certain novel arrangements, is capable of opening up to expose its compartments without the use of springs of any kind. In accomplishing this purpose I have utilized push pieces at the opposite ends of the casing to release the main cover and to lift or swing it upwardly to its full open position, continued pressure on one of the pieces being transmitted to a release for a second cover piece or compartment to allow it to swing open and uncover a lower compartment.

Referring again to the exterior of the case, it cannot be too strongly emphasized that no matter what mechanism may be used in the interior the exterior must retain a perfectly balanced proportion as to its various dimensions, leaving the surfaces smooth to accommodate the highly finished enamels so often used and giving to these surfaces just the proper curve and line to bring every possible artistic effect. I have brought about this result in the embodiment of my invention described in the following specification, set forth in the appended claims and illustratively exemplified in the accompanying drawings in which:

Figure 8:
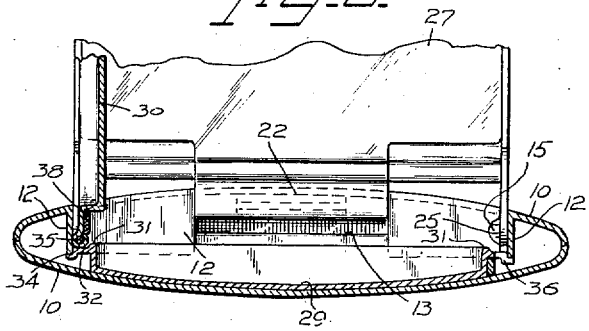
Figure 8 is another substantially transverse sectional view taken on lines 8—8 of Figure 4 but with compartments open.

Referring to the drawings, 10 denotes the metal shell, which constitutes the casing proper and which consists of two parts, each thereof being rectangular in shape and curved outwardly toward its longitudinal mid portion. The longitudinal sides of each part of the shell are curved to form half round sections when joined with the corresponding sides of the other part. The ends of the shell 10 are open and the material along the ends is turned inwardly at right angles to form flanges 11. The part of the shell forming the top of the casing is cut out in its center portion and the material is turned inwardly at right angles to form a depending flange 12. The opening in the upper part is rectangular and it is nearer to one end of the part than to the opposite end; i. e., the frame part surrounding the opening is wider at one end than at the other. The depending flange 12 at the wider end of the frame is cut away at the mid portion to provide an opening 13 and intermediate its width there remains a strip of the flange which is bent back under the wide portion of the frame and is then rolled on itself to provide a cylindrical section 14 of a hinge connection. The outer ends of the flange beyond the cut are short of the corners of the frame and are provided with bifurcated edges 15, illustratively exemplified in Figure 8.

The opening in the shell is closed by a cover 16 which conforms to the curve of the upper part and fits closely the size of the opening so that when in closed position the upper face of the shell is smooth and unbroken. The cover 16 comprises a top and sides 17, the latter of which are not very deep and rest closely adjacent the inner walls of the opening. The wall 17, forming the front or free end of the cover 16, is provided with a short slot 18 midway of its length and depth. The rear wall of the cover is cut away at its mid portion to form a T-shaped opening 19 to accommodate a hinge plate 20. The hinge plate 20 comprises an upright back portion arranged against the rear wall 17 on the inner side thereof and held in place by turning the free ends of the rear wall over and about the back portion, the latter being further provided with small projections 21 which engage over the lower wall of the cross portion of the T-shaped opening 19. The projections 21 tend to prevent any play between the rear wall and the hinge plate 20. The lower side of the upright back portion of the plate 20 is provided with a projection 22, which is the width of the stem portion of the opening 19, and which is turned slightly upwardly and rearwardly and then about itself to form a pair of hinge bearings 23 arranged to embrace opposite ends of the hinge section 14 of the shell 10. A hinge pin 24 is arranged in the section 14 and bearings 23 to enable the cover 16 to hinge on the shell 10. In practice the hinge bearings 23 are slightly offset from the line of the section 14 so that when the free end of the cover is free it will spring open to a point just slightly above or beyond the outer surface of the upper part of the shell 10. The side walls 17 at the hinged end of the cover project beyond the latter end and form lever arms 25 provided with aligned openings 26 at their free ends, the axis of the openings 26 being disposed rearwardly and slightly below the axis of the hinge connection between the shell 10 and cover 16, the purpose of the lever arms 25 and openings 26 being hereinafter described.

It might be mentioned at this point in the description that the cover 16 is constructed to carry a mirror 27 flush with the open or inner sides of the walls 17 and hinged to a portion of the cover at its inner end. The mirror 27 may provide a cover for a compartment 28 arranged within the cover for the purpose of containing rouge or other cosmetics. The construction of the cover 16 as regards its inner construction may be modified in many ways and forms no part of the present invention.

Figure 1:
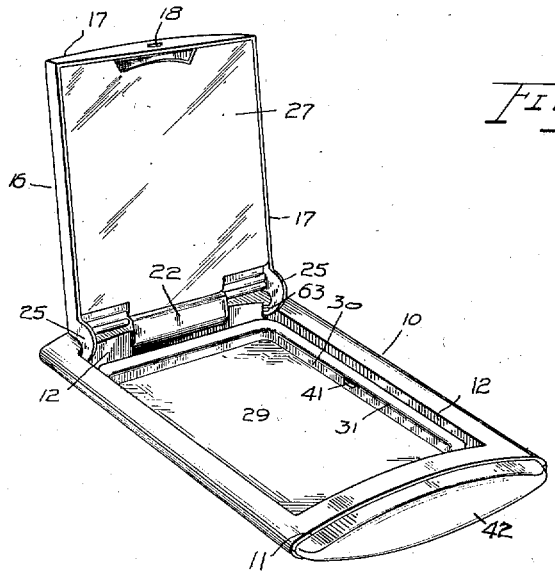
Figure 1 is a perspective view of a vanity case showing its cover raised to give access to one of the compartments.
Figure 2:
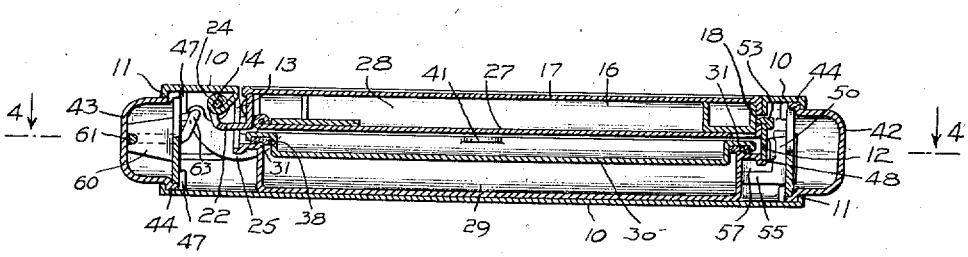
Figure 2 is a substantially longitudinal sectional view of the case with all the compartments closed.
Figure 3:
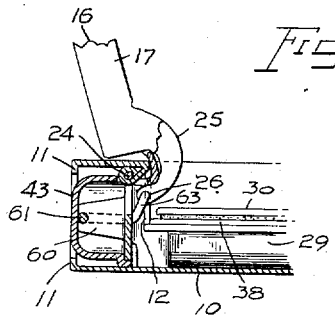
Figure 3 is a sectional view of the cover lifting end of the case showing the cover in full open position.
Figure 10:
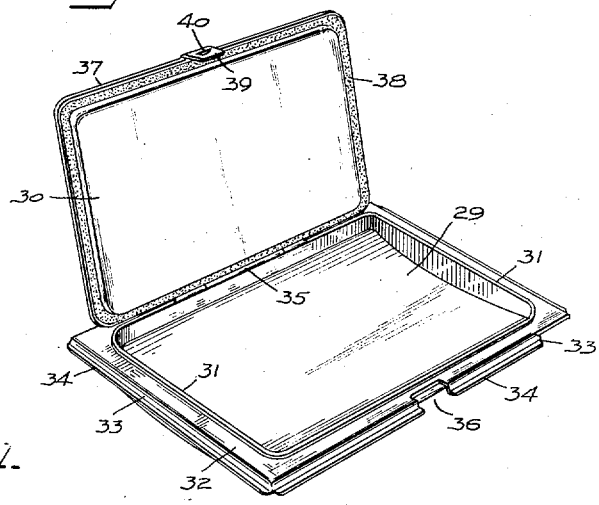
Figure 10 is a perspective view of the inner container with its cover in open position.

Arranged within the opening in the shell and held in position by the depending flange 12 is a container 29 and a hinged cover 30. The container is virtually a separate unit and may be used to contain a supply of powder while the cover is especially designed to contain the puff or powder applicator. The container 29 is a shallow pan having its bottom wall slightly concave to conform to and rest upon the correspondingly shaped surface of the under part of the shell 10. The depression in the container forming the shallow pan is somewhat smaller than the opening in the upper part of the shell and is about one half the depth of the latter so that while every available space has been utilized the container 29 leaves sufficient room above it to accommodate its covers 30 and the outside cover 16. The rim of the container 29 immediately surrounding the sides thereof is shaped into a bead 31 and then drops down to a flat surface or frame 32 which meets the walls 12 of the shell opening. Beyond the frame 32 the material thereof is bent downwardly at right angles to form a depending skirt 33 and outwardly to form a flange or ledge 34 which is positioned just under the lower ends of the wall 12, as illustrated particularly in Figures 2 and 3. When the two parts of the shell are assembled the lower or under side of the wall 12 seats in the ledge 34 and holds the container down against the lower part of the shell and inasmuch as the container is engaged at all of its four sides the same is prevented from shifting or being moved relatively of the shell. The cover 30 for the container 29 opens out of its longitudinal side on a hinge connection 35. The ledge 34 opposite the hinge connection is provided with a notch or slot 36, as illustrated particularly in Figures 8 and 10. The cover 30 comprises a pan shaped member more shallow than the container and adapted to fit into the latter when closed. It is essential in this type of article that the powder container be sealed when closed to prevent waste and gathering of the powder outside the storage space assigned for the purpose. To insure a perfect seal the cover is formed with a flange 37 framing the depression and being rolled over on itself about its edge to embrace the edge of a gasket 38 disposed and held against the under side of the flange 37. The cover in its closed position brings the packing 38 into engagement with the bead 31 as shown in Figure 2. The free longitudinal side of the flange 37 is provided with a depending tab or lip 39 adapted to enter the slot 36, the lip having an offset 40 to engage under the flange or frame 32 to hold the cover closed against the tendency of its hinge connection 35 to open the cover slightly. To manually lift the cover 30, the flange 37 is provided with a lip 41 projecting sufficiently into the recess of the cover to enable the finger nail to be brought up under the lip 41 to raise the cover.

Figure 6:
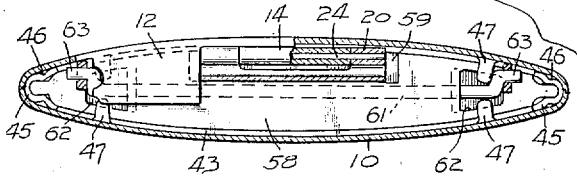
Figure 6 is a substantially transverse sectional view taken on lines 6—6 of Figure 4.
Figure 7:
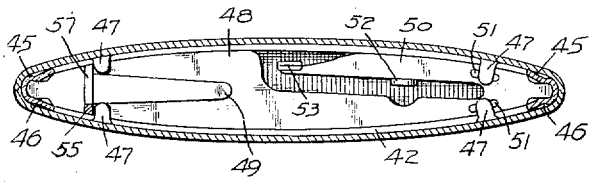
Figure 7 is a similar sectional view taken on lines 7—7 of Figure 4.

I have described so far a vanity case embodying a shell 10 with an opening closed by a combination cover, mirror and rouge receptacle 16 and an inner receptacle and cover therefor to contain the powder and means for applying it. In order to carry out the purpose of the invention and to manipulate the opening of both covers from the outside of the shell 10, I have arranged push pieces 42 and 43 at opposite ends of the shell 10, the former being disposed at the front thereof while the latter is located at the rear or hinge end of the shell. The body portions of both push pieces are the same and comprise elongated hollow members, each having a contour to conform to the opening between the flanges 11 at the end of the shell. The outer portion of each pusher is closed and when in position in the shell it conforms to the general line thereof to produce a smooth rounded surface. The inner or open face of the pusher is provided with a raised flange 44 which forms a seat adapted to engage the inner edge of the flange 11. The pusher in conforming to the lines of the shell 10 is tapered to a point at each end and in forming the ends the material is elongated to provide guides or shoes 45, which are disposed at right angles to the axis of the pusher and project inwardly along the rounded sides of the shell adjacent its ends, and which are each grooved at 46 along opposite sides to increase their guiding operation to insure uniform movement of both ends of the pusher into and out of the shell. Each pusher carries a plate over its open face and the inner shoulder formed by the flange 44 is utilized as a seat against which the plate rests, the latter being held in position flush with the flanges 44 by tabs 47 arranged on opposite sides thereof adjacent opposite ends of the pusher, as illustratively exemplified in Figures 6 and 7.

Figure 4:
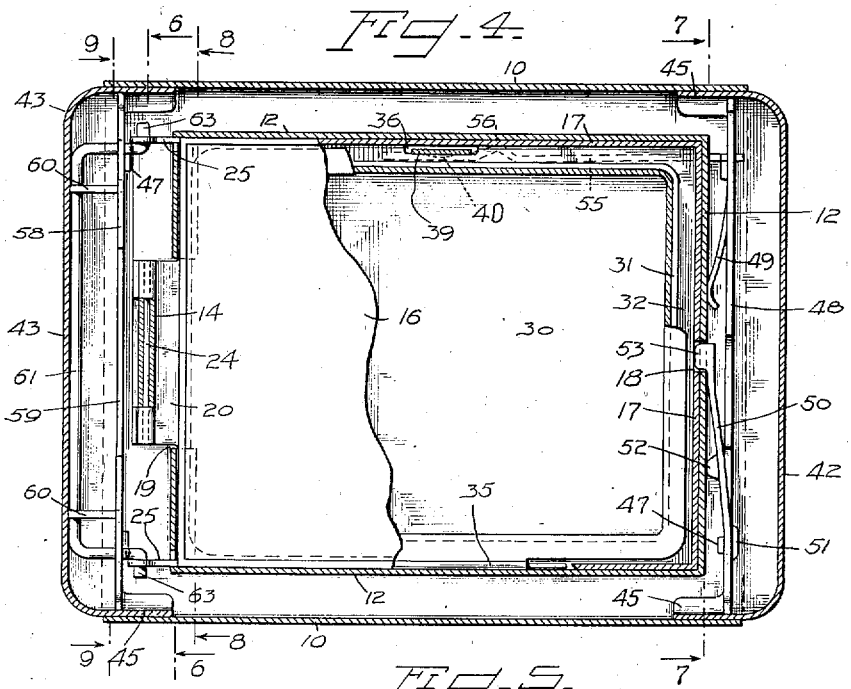
Figure 4 is a sectional view taken on lines 4—4 of Figure 2.
Figure 5:
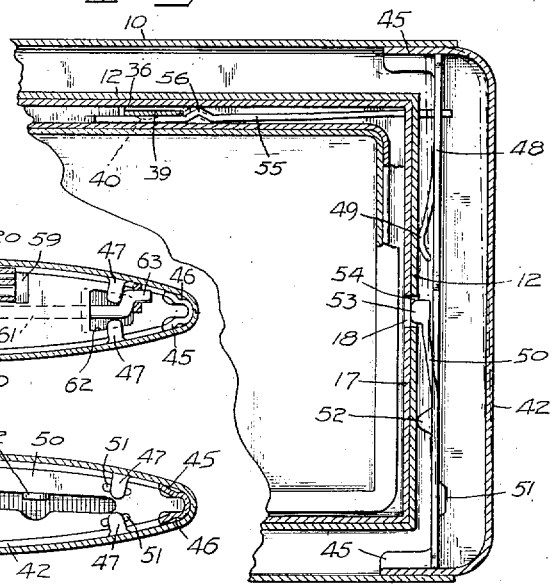
Figure 5 is a sectional view similar to Figure 4 except that the cover releasing end is shown in releasing position.

The pusher 42, being arranged at the front end of the shell, is utilized to disengage the free end of the cover 16, and incidentally is the first of the two to be pushed when the vanity case is to be opened. The plate 48 carried by this pusher comprises a flat spring metal member having a spring tongue 49 stamped out of its longitudinal mid portion adjacent one end and adapted to yieldably engage against the outer face of the flange 12, as shown in Figures 2, 4 and 5, to urge the pusher to project outwardly and axially of the shell or casing 10. In the opposite end of the plate 48 a second tongue 50 is provided, which projects toward the first tongue 49, and which consists of a portion of the plate along its upper side. The tongue 50 is bent to project inwardly toward the wall or flange 12 and the inner end of the tongue and the adjacent portion of the plate are provided with dents or reenforcing grooves 51 for the purpose of strengthening the material of the plate at a point where considerable rigidity is required. The lower side of the tongue 50, substantially midway of its length, is provided with a projection 52 which engages against the wall 12 and tends to retract the tongue 50 when the pusher is moved toward the wall. The free end of the tongue 50 is approximately in the center of the pusher and shell and is turned outwardly from the tongue to form a latch 53, which projects through a slot 54 in the front wall 12 and into the slot 18 of the free end of the cover 16 to hold the latter closed. The tapered ends of the plate 48 are cut out to provide tongues adapted to fit tightly in the specially shaped and grooved walls of the shoes 45. It will be clear that in the operation of these parts, inward movement of the pusher 42 will cause the spring tongues 49 and 50 to yield and the latch 53 to retract from the slot 18 in the cover 16, and to release it. The tension under which the hinge connection 14 is will force the cover to lift slightly out of the opening.

The plate 48, adjacent one end and beyond the inner end of the tongue 49, carries an arm 55 which projects inwardly at right angles to the line of the plate and which is provided with an outwardly disposed riser 56. The arm 55 has a cut out 57 at its upper edge adjacent the plate to allow it to be projected under the walls or flanges 12 and 33 and into and along the space between the latter and the outer face of the side wall of the inner container 29. The riser 56 is normally at the end of the slot 36 and the part beyond the riser reaches under the flange 37 beyond the slot 36. The tab or lip 39 projecting through the slot 36 is arranged on the outside of the arm 55 so that when the pusher is depressed farther into the shell than is required to release the cover 16, the riser will engage in back of the lip 39 and cause it to be sprung outwardly enough to free the offset 40 from the edge of the slot, whereupon the inner cover 30 is free to swing open.

Referring now to the opposite end or rear of the shell 10, the plate 58 carried by the pusher 43 comprises a flat member flush with the open end of the pusher and held in position by the tabs 47. The upper half of the mid portion of the plate 58 is cut away to form an opening 59 into which the hinge connection for the cover 16 moves when the latter is closed, as shown in Figure 2. Adjacent opposite ends of the plate 58, U-shaped cuts are made, the open ends thereof facing each other and the material therein being bent into the pusher to abut the inner side of the closed end thereof and form bearings 60. The ends of the bearings 60 are grooved or slotted to embrace a rocking rod 61 near its ends to hold the latter in place within the pusher. The ends of the rod 61 beyond the bearings 60 are bent forwardly in an upwardly disposed curve and then at a point beyond the plate, after projecting through the openings 62 left by the bearings 60, they turn outwardly to form crank pins 63 which project into the openings 26 of the arms 25 on the cover 16.

It will be seen in the operation of the device, that by grasping the vanity case in the hand so as to bring the pusher 43 in front of the index and first fingers and the pusher 42 in the fleshy portion of the hand at the base of the thumb, any pressure exerted on the case by contracting the hand will cause the pusher 42 to recede first to release the cover 16. This will be followed by a complete inward movement of the other pusher 43, which because of its link or rod connection 61 with the cover 16, will cause the latter to swing to full open position as the arms 25 coact with the crank pins 63. Only in the event that the inner container 29 is to be opened is it necessary to push the pusher 42 farther into the shell to release the cover 30 as described herein.

Figure 11:
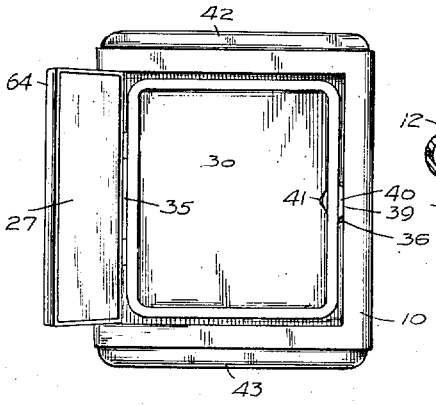
Figure 11 is a top plan view of a modified embodiment of my invention showing the outer cover hinged along its longitudinal side instead of at one end as in the preceding illustrations.
Figure 9:
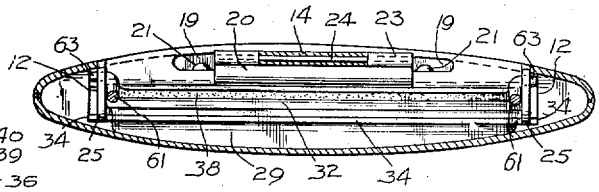
Figure 9 is still another transverse sectional view taken on lines 9—9 of Figure 4.

In the modification of my invention shown on Figure 11, the construction is changed to allow the cover plate 64 to be hinged to the wall 12 of the shell along one of its longitudinal sides instead of at one end as in the other form. The pushers will operate to release and open the covers in practically the same manner as set forth above in connection with the other embodiment.

Having described my invention and the manner in which the same is constructed and operated, what I claim and desire to secure by Letters Patent is:

1. A vanity case of the character described, comprising a shell open at its ends and having an opening in the upper side thereof, a cover for the opening hinged at one end to the shell, and a push piece slidable in each open end of the shell, one push piece being connected to the cover to lift the latter and the other push piece engaging the free end of the cover to hold it closed in one position and to release it in its other position.

2. A vanity case of the character described, comprising a shell open at its ends and having an opening in the upper side thereof, an inner receptacle arranged in said opening, a hinged cover for the inner receptacle, a cover for the opening of the shell to close over the receptacle, and a push piece slidably mounted in each open end of the shell, one push piece being connected to the cover for the shell to swing the same to open position, the other pusher being operatively associated with both covers to independently engage and release each cover to permit them to open.

3. A vanity case of the character described, comprising a hollow shell which is open at its opposite ends and has an opening in the upper side walled by a depending flange projecting toward the bottom sides, an inner receptacle engaged under the depending flange and against the bottom of the shell, a cover hinged to the receptacle, a cover hinged to the shell to close the opening, and a push piece slidably mounted in the opposite open ends of the shell, one push piece being connected to the cover to raise the same to its open position, and the other push piece being operatively associated with the free ends of the two covers to hold the outer one closed, and to release them both, the outer one first and the inner one after the first push piece has operated to lift the outer cover.

4. A vanity case of the character described, comprising a hollow shell open at its opposite ends and provided with an opening in its upper side, a cover hinged at its end to the inside of the shell to close the opening, and a push piece slidably mounted in the opposite open ends of the shell, one of the push pieces being connected to the cover on a line rearwardly and below the axis of the hinge, whereby movement of the push piece into the shell will cause the connection with the cover to move under the axis of the hinge to swing the cover upwardly.

5. A vanity case, as claimed in claim 4, in which the hinge connection between the shell and cover is formed by a rearwardly bent portion of the shell at the rear edge of the opening which is rolled to embrace a hinge pin and a divided bearing projecting from the cover to receive the pin and embrace opposite ends of the bent portion carrying the pin, said cover having rearwardly projecting arms having aligned openings, the axis of which in the closed position of the cover is rearwardly and below the axis of the hinge, and including a link between the openings in the arms of the cover and the pusher to lift the lid by the inward movement of the pusher.

6. A vanity case, as claimed in claim 4, in which the opening in the shell is formed by depending a wall at the edge of the opening, the rear wall being cut on opposite sides of the center and the material therebetween turned rearwardly and about upon itself, a hinge pin projecting from opposite ends of the turned under material, the cover having side and end walls to fit the walls of the opening, the rear wall of the cover having a T-shaped opening, and a hinge piece carried by the rear wall and provided with a back plate to rest against the inner side of the rear wall, said plate having projections to project into the cross part of the T-shaped opening to engage the side of the latter, and a rearwardly projecting divided hinge bearing to receive the pin at opposite ends of the fixed portion of the hinge, the lower ends of the rear wall sections being bent over and about the lower edge of the back plate to hold the hinge piece rigidly to the cover.

7. A vanity case, as claimed in claim 4, in which the other push piece is provided with a spring portion to project the same and a second spring portion having a latch to releasably engage the free end of the cover to hold it in closed position, and to withdraw from the cover by pushing the said last named push piece into the shell.

8. A vanity case, as claimed in claim 4, in which one of said push pieces comprises a long tapered hollow member having inwardly projecting end portions to slide against and be guided by the sides of the shell, and tabs projecting from its open side, a plate closing the open side and being held in place by the tabs which are turned over on the plate, said plate comprising a flat piece having a spring tongue to abut a portion of the shell and hold the push piece in projected position and a second tongue cut and bent from the plate and having its free end turned outwardly to form a latch piece and its mid portion turned outwardly to form a lip to abut a portion of the shell to hold the latch projected to engage the cover, the plate at the base of the second tongue and portion adjacent the latter being dented to reenforce the material.

9. A vanity case of the character described, comprising a substantially elongated hollow shell open at its opposite ends and having an opening in its upper side, walls for the opening depending into the shell, an inner receptacle comprising a flanged portion to rest under the free lower sides of the walls whereby the receptacle is held in position against the inner face of the under side of the shell, a cover hinged to the receptacle to close the same, a cover for the opening in the shell, and push pieces operable in the open ends of the shell and cooperating with the covers to release the free end of the outer cover, thereafter raise the latter cover to full open position and then release the free end of the receptacle cover.

10. A vanity case, as claimed in claim 9 in which the inner cover is held closed by a projection entering an opening in the flange and being releasably engaged by the wall of the last opening, the push piece releasing the inner cover having an arm projecting into the shell and adjacent the projection, the arm having a cam surface to engage the projection on its inward movement with the push piece to spring it out of engagement with the wall of the slot, whereby the inner cover may be raised.

11. A vanity case, as claimed in claim 9, in which the flanged portion of the receptacle is provided with an upwardly projected bead about its rim, and in which the receptacle cover is provided with a flange to meet the flange of the receptacle in closed position and including a gasket member superimposed on the underside of the cover flange which is turned over at its outer edge to embrace the gasket, the latter forming a seal to prevent loss of the contents of the receptacle.

12. A vanity case of the character described, comprising an inner receptacle having a shallow base, lateral flanged side walls and a bead projecting upwardly from the latter portion of the side walls, a cover hinged to the base and provided with a shallow center portion projecting into the receptacle in closed position and having a lateral flanged frame to close over the flange and bead of the side walls of the receptacle, and a gasket supported under the flange of the cover and interposed between the latter and the base in closed position to form a seal as the bead projects into the gasket.

13. A vanity case, as claimed in claim 12 including a spring lip on the free side of the cover flange opposite the hinge connection, a dent in said lip, the flange of the base having a slot to receive the lip and permit the dent in the latter to engage under the flange and hold the cover closed.

14. A vanity case, as claimed in claim 12, in which the hinge connection comprises a set of hinge straps which are offset with respect to their axes to cause the hinge to be under strain to open the cover when the latter is fully closed.

15. A vanity case of the character described, comprising a shell in which its greatest thickness is at its longitudinal mid portion and being tapered off toward its sides which are substantially half round, the ends of the shell being open and having inwardly projecting flanges, the upper portion of the shell being provided with an opening and the material turned inwardly to form the walls of the opening, a cover hinged to the shell and closing into the opening to rest flush with the outer surface of the shell, push pieces slidably arranged in the open ends of the shell and held therein by the said flanges, the push pieces being shaped to conform to the ends of the shell and having their outer ends rounded, said push pieces being connected with the cover at its hinged end to raise it to full position when one piece is depressed into the shell and to engage the free end of the cover to hold it closed and to release it when the other push piece is pushed into the shell.

16. A vanity case, as claimed in claim 15, in which the cover is provided with rearwardly projecting arms having aligned openings which move in a circle about the axis of the hinge as a center and in closed position of the cover the openings are disposed rearwardly and below the elevation of the hinge, a link connecting one of the push pieces and the openings in the arms whereby inward movement of the push piece will swing the cover to open position.

17. A vanity case of the character described, comprising a shell open at its ends and provided with an opening in its upper wall, an inner receptacle disposed in said shell, a cover for the receptacle hinged along a side of the latter and having a depressed center portion to accommodate a powder puff, a cover for the shell hinged to the latter along one end thereof and adapted to close the opening over the inner receptacle, a push piece operating in the open ends of the shell, means to connect one push piece to the hinged end of the outer cover to raise the latter, and means connected with the other push piece to successively release both covers to permit the same to be opened.

18. A vanity case, as claimed in claim 17, in which the hinge connection for each cover is arranged normally to lift and hold the cover slightly open.

19. A vanity case, as claimed in claim 17, in which the means to lift the cover comprises a U-shaped link rotatably mounted in one of the push pieces and having its arms projecting forwardly into the shell and then outwardly to enter openings in the outer cover which are aligned and arranged rearwardly and below the axis of the hinge connection between the shell and the outer cover.

20. A case of the character described having an opening in the upper side thereof, a cover for said opening, a receptacle in said case below said cover, a cover for said receptacle, means for releasably fastening said covers in closed position, means operable under one condition to release only the fastening means for said first cover and operable under another condition to release also the fastening means for said second cover and push button means movable in said case and operatively connected to said first cover for moving the latter to open position upon the release thereof.

21. A case of the character described having an opening in the upper side thereof, a cover for said opening, a receptacle in said case below said cover, a cover for said receptacle, means for releasably fastening said covers in closed position, means operable under one condition to release only the fastening means for said first cover and operable under another condition to release also the fastening means for said second cover, means movable in said case accessible externally thereof and operable upon release of said fastening means of said first cover to move the latter to open position, and means operable upon release of said fastening means for said second cover to move the latter to open position.

22. A case of the character described having an opening in the upper side thereof, a cover for said opening, a receptacle in said case below said cover, a cover for said receptacle, means for releasably fastening said covers in closed position, means operable under one condition to release only the fastening means for said first cover and operable under another condition to release also the fastening means for said second cover, means movable in said case accessible externally thereof and operable upon release of said fastening means of said first cover to move the latter to open position, and spring means operable upon release of said fastening means for said second cover to move the latter to open position.

23. A case of the character described having an opening in the upper side thereof, a cover for said opening, a receptacle in said case below said cover, a cover for said receptacle, means for releasably fastening said covers in closed position, means operable under one condition to release only the fastening means for said first cover and operable under another condition to release also the fastening means for said second cover, push bottom means movable in said case accessible externally thereof operable upon release of said fastening means of said first cover to move the latter to open position, and spring means operable upon release of said fastening means for said second cover to move the latter to open position.

24. A container having a cover therefor, a catch for releasably holding said cover in closed position, means forming a compartment within said container, a cover for said compartment hinged within said container, a spring for moving said compartment cover to open position, means for releasably fastening said compartment cover in closed position within said container, said fastening means comprising a flexible catch in engagement with a part of said container when said compartment cover is closed, means operable externally of the container for releasing said first catch to permit said container cover to move to open position, and a member operable under the control of said last mentioned means to engage said second catch and flex the latter out of engagement with said container part.

25. In a case of the class described, a receptacle formed therein, a hinged cover for said receptacle, said cover having a flexible catch adapted to engage a part of the case to releasably hold the cover in closed position, means movably mounted within the case and adapted to engage said catch to flex the latter out of engagement with said part of the case, and a member operable externally of the case for actuating said last mentioned means.

26. In a case of the class described, a hinged cover therefor, a catch for said cover, a receptacle formed in said case, a hinged cover for said receptacle, said receptacle cover having a catch, means mounted in said case and movable toward the hinged end of one of said covers for releasing said catch of the receptacle cover, and a member operable externally of the case for releasing the catch of said cover and for actuating said last mentioned means to release the catch of said receptacle cover, said member being movable toward and away from the hinged end of one of said covers.

27. In a case of the class described, a hinged cover therefor, a catch for said cover, a receptacle formed in said case, a hinged cover for said receptacle, said cover having a catch, means mounted within the case and movable toward the hinged end of one of said covers to release said catch of the receptacle cover, and a member movably mounted in said case below the cover thereof and operable externally of the case for releasing said catch of the case cover and for actuating said last mentioned means to release the catch of said receptacle cover.

28. A vanity case of the character described, comprising a receptacle having lateral flanged side walls and a bead projecting upwardly from the latter portion of said side walls, a cover hinged to said receptacle and having a lateral flanged frame to close over the flange and bead of the side walls of the receptacle, and a gasket supported under the flange of the cover and interposed between the latter and the flange of the receptacle in closed position to form a seal as the bead projects into the gasket.

29. A vanity case comprising a receptacle having lateral flanged side walls and a bead projecting upwardly from the latter portion of said side walls, a cover hinged to said receptacle and provided with a flange to meet the flange of the receptacle in closed position, and a gasket member superimposed on the under-side of the cover flange and engaging said bead when the cover is closed to form a seal.

30. In a container construction, a case having a plurality of compartments and covers therefor, cover catches for said covers, latches cooperating with said catches, and a releasing mechanism positioned in said case and movable for successively releasing said catches.

31. A device of the character described comprising a casing, two parts each separately hingedly mounted in said casing and one such part arranged to act as a cover for the casing, a single manually operable finger piece in said casing, and means responsive to manual manipulating of said finger piece to swing said parts successively each about its hinge mounting.

32. A device of the character described comprising a casing, two parts each separately mounted in said casing and one such part arranged to act as a cover for the casing, each part being normally urged to swing about its hinged mounting to open position, a separate means for retaining each of said parts in closed position, a single finger piece extending into said casing, and means responsive to movement of said finger piece to release each of said separate retaining means.

33. A device of the character described, comprising a casing, two elements each separately hingedly mounted therein, one such element being arranged to act as a cover for said casing, a movable member mounted in said casing, a catch for each of said elements releasable upon movement of said member, and a single finger piece for moving said movable member to release both of said catches.

JACQUES KREISLER.